United States Patent
Zenba et al.

[11] Patent Number: 5,944,389
[45] Date of Patent: Aug. 31, 1999

[54] SEAT CUSHION AND PROCESS OF PRODUCING SAME

[75] Inventors: Masaaki Zenba; Yutaka Hirata; Kazushige Ebe, all of Yokohama, Japan

[73] Assignee: Bridgestone Corporation, Tokyo, Japan

[21] Appl. No.: 08/905,405

[22] Filed: Aug. 4, 1997

[30] Foreign Application Priority Data

Aug. 2, 1996 [JP] Japan ................... 8-204963

[51] Int. Cl.[6] ............................................ A47C 7/02
[52] U.S. Cl. .................. 297/452.48; 297/DIG. 1; 156/78
[58] Field of Search ............ 297/452.48, 452.26, 297/452.27, 452.37, 452.61, DIG. 1, DIG. 2; 5/953; 264/46.4, 46.5, 46.6; 156/78, 79

[56] References Cited

U.S. PATENT DOCUMENTS

| | | | |
|---|---|---|---|
| 4,755,411 | 7/1988 | Wing et al. | 297/DIG. 1 |
| 4,837,881 | 6/1989 | Kondo et al. | 297/DIG. 1 |
| 4,995,926 | 2/1991 | Urai | 297/DIG. 1 |
| 5,460,873 | 10/1995 | Ogawa et al. | 297/DIG. 1 |
| 5,702,159 | 12/1997 | Matsuoka et al. | 297/452.48 |

*Primary Examiner*—Laurie K. Cranmer
*Attorney, Agent, or Firm*—Sughrue, Mion, Zinn, Macpeak & Seas, PLLC

[57] ABSTRACT

A seat cushion comprises a cushion main body formed of a polyurethane molded foam; a seat member formed of a slab flexible polyurethane foam; and a sheet having a gas permeability; wherein part of a foamable liquid for forming the polyurethane molded foam permeates in the sheet and the seat member, and is foamed when the foamable liquid having not permeated in the sheet and the seat member is foam molded, whereby the seat member is integrated with a seat surface portion of the cushion main body through the sheet.

15 Claims, 3 Drawing Sheets

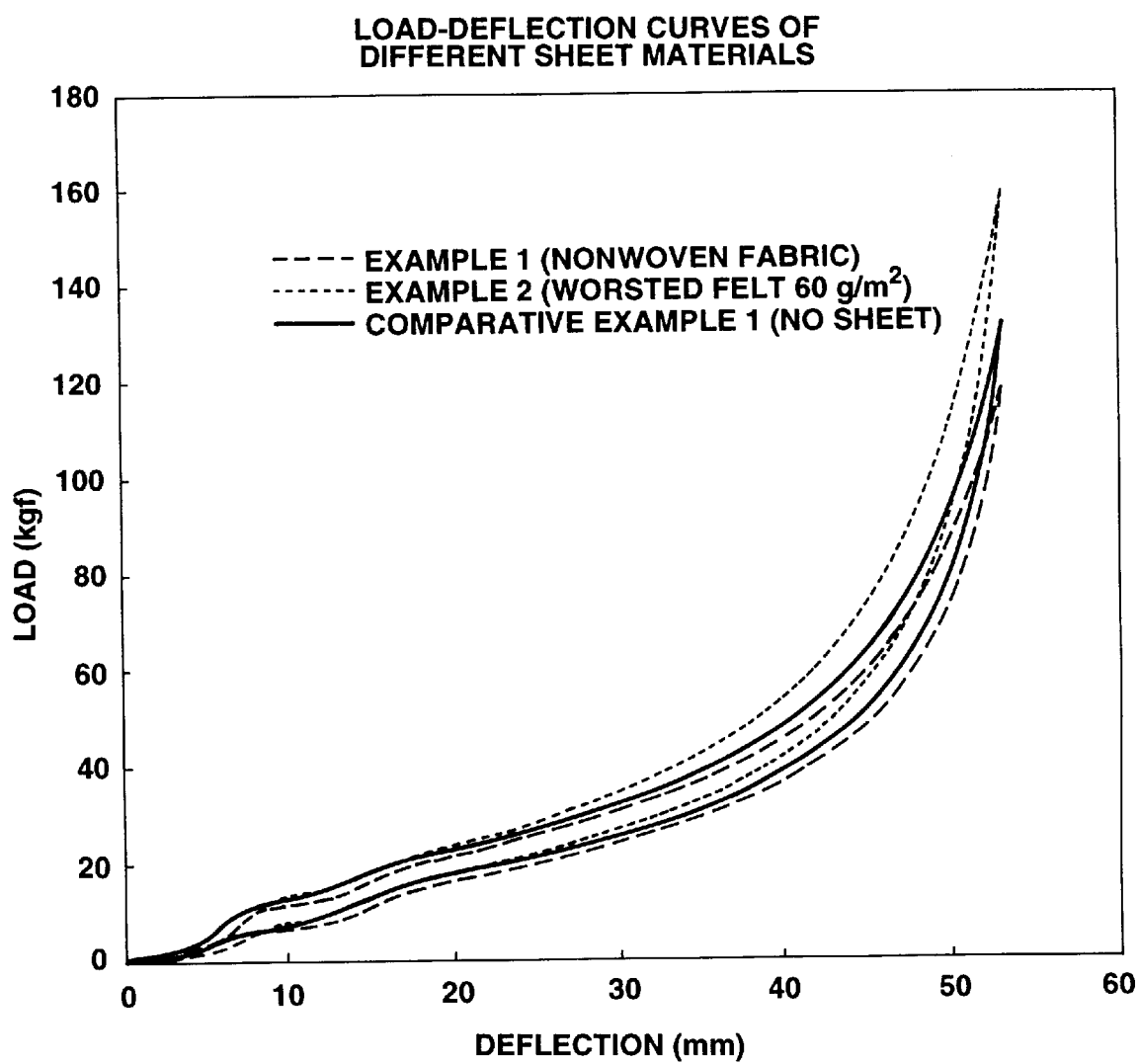

SEAT CUSHION AND PROCESS OF PRODUCING SAME

BACKGROUND OF THE INVENTION

The present invention relates to a seat cushion used for various kinds of vehicles such as automobiles and rolling stock, and a process of producing the seat cushion.

To improve a feeling of seating and a vibration transmission characteristic of a seat cushion, there has been proposed an attempt in which a slab of flexible polyurethane foam having a specific size is integrally joined on a seat surface portion of a seat cushion main body formed of a polyurethane molded foam by a post-sticking process or an integrally foaming process. In particular, to omit the post-treatment step, the integrally foaming process has been widely adopted.

In the integrally foaming process, a foamable liquid for forming a polyurethane molded foam partially permeates in a slab flexible polyurethane foam. In this method, a foamable liquid impregnated surface of the slab foam is hardened by foaming of the foamable liquid, to form a hardened layer. In design of a seat, such a hardened layer is sometimes considered undesirable for the reason that it brings a feeling of physical disorder, and in other cases, it is positively incorporated into the design for the reason that it brings a feeling of surface rigidity.

The above process of joining a slab flexible polyurethane foam on a polyurethane molded foam by integral foaming, however, has the following disadvantages:

(1) The surface of the slab flexible polyurethane foam, which is brought in contact with a foamable liquid for forming the polyurethane molded foam, is hardened by foaming of the foamable liquid impregnated therein, so that a hardened layer with a surface rigidity is formed. However, in this case, it is impossible to adjust the hardness and thickness of the impregnated/hardened layer exerting a large effect on the riding comfortability of the seat cushion.

(2) When the foamable liquid for forming the polyurethane molded foam is foamed, the foamable liquid having impregnated in the slab flexible polyurethane foam is expanded by foaming, and thereby the contact surface of the slab foam with the foamable liquid is also expanded, to be thus extended.

As a result, there occurs a difference in size between the contact surface (interface) of the slab foam having impregnated with the foamable liquid and the opposed surface thereof having not impregnated with the foamable liquid. This causes a phenomenon shown in FIG. 2, in which there occur local depressions in the slab foam on the front surface side of the product, that is, a camber and/or a shrinkage of the seat.

SUMMARY OF THE INVENTION

An object of the present invention is to provide a seat cushion improved in feeling of seating without occurrence of. the above camber and/or shrinkage, and a process of producing the seat cushion.

To achieve the above object, according to a first aspect of the present invention, there is provided a seat cushion comprising: a cushion main body formed of a polyurethane molded foam; a seat member formed of a slab flexible polyurethane foam; and a sheet having a gas permeability; wherein part of a foamable liquid for forming the polyurethane molded foam permeates in the sheet and the seat member, and is foamed when the foamable liquid having not permeated in the sheet and the seat member is foam molded, whereby the seat member is integrated with a seat surface portion of the cushion main body through the sheet.

According to a second aspect of the present invention, there is provided a process of producing a seat cushion comprising a cushion main body composed of a polyurethane molded foam obtained by foam molding a foamable liquid in a mold and a seat member composed of a slab flexible polyurethane foam integrated on a seat surface portion of the cushion main body, the process comprising the steps of: setting the seat member in the mold at a position corresponding to the seat surface portion of the cushion main body, laminating a sheet having a gas permeability on a surface, facing the seat surface portion, of the seat member; pouring the foamable liquid in the mold; foam molding the foamable liquid having not permeated in the sheet and the seat member, thereby forming the cushion main body; and simultaneously foaming part of the foamable liquid having permeated in the sheet and the seat member; whereby the seat, member is integrated with the seat surface portion of the cushion main body through the sheet.

According to a third aspect of the present invention, there is provided a seat cushion comprising: a cushion main body formed of a polyurethane molded foam; a seat member formed of a slab flexible polyurethane foam; and a sheet having no gas permeability, the sheet being bonded to the seat member; wherein a seat surface portion of the cushion main body is integrally joined to the sheet by foaming of a foamable liquid for forming the polyurethane molded foam.

According to a fourth aspect of the present invention, there is provided a process of producing a seat cushion comprising a cushion main body composed of a polyurethane molded foam obtained by foam molding a foamable liquid in a mold and a seat member composed of a slab flexible polyurethane foam integrated on a seat surface portion of the cushion main body, the process comprising the steps of: laminating and bonding a sheet having no gas permeability on the seat member; setting the laminated body in the mold at a position corresponding to the seat surface portion of the cushion main body in such a manner that the sheet faces the seat surface portion; pouring the foamable liquid in the mold; foam molding the foamable liquid, thereby forming the cushion main body and simultaneously integrally joining the sheet on the cushion main body; whereby the seat member is integrally joined to the seat surface portion of the cushion main body through the sheet.

The above sheet having a gas permeability is preferably made of one or two or more kinds of materials selected from the group consisting of a nonwoven fabric, a worsted felt, and a victoria lawn. The above sheet having no gas permeability is preferably made of one or two or more kinds of materials selected from the group consisting of polypropylene, polyethylene, polyurethane, vinylon, and nylon.

As described above, in one example of the prior art process for producing a seat cushion, a foamable liquid is poured into a mold in which a slab flexible polyurethane foam has been set, and is foam molded into a polyurethane molded foam, whereby the slab foam is integrated with the polyurethane molded foam. In this case, the deflection characteristic, feeling of seating, riding comfortability, etc. of the seat cushion are dependent on the degree of impregnation of the foamable liquid into the slab foam. As a result, the adjustment of the degree of the impregnated state of the foamable liquid in a wide range is expected as an effective design means for changing the various physical properties, feeling of seating, and riding comfortability of the seat cushion.

According to the present invention, by selecting the kind of a sheet provided between a slab foam and a foamable liquid, it is possible to change the degree of impregnation of an impregnated layer of the slab foam in a state in which the foamable liquid is impregnated in the sheet or in a state in which the foamable liquid is not impregnated in the sheet but is only brought in contact therewith. More specifically, the thickness and the hardness of the impregnated layer of the slab foam can be suitably adjusted by selecting the kind, unit weight, etc. of the sheet. In addition, there may be selected the case where the impregnated layer of the slab foam is not formed. Further, according to the present invention, when the foamable liquid is poured in the mold, the sheet in contact with the slab foam forcibly suppresses extension of the slab foam due to expansion of the foamable liquid, so that it is possible to prevent occurrence of a local camber and/or a shrinkage of the slab foam.

Specifically, according to the prior art process for joining a slab foam on the surface of a polyurethane molded foam by integral foaming, the state of a foamable liquid impregnated layer of the slab foam cannot be adjusted. As a result, the impregnated layer as an intermediate layer exerting a large effect on the riding comfortability, etc. cannot be arbitrarily selected and suitably incorporated in design; and further, a camber and/or a shrinkage possibly occur at the impregnated layer.

According to the present invention, however, various data (thickness, load-deflection curve, and the like) of impregnated layers can be prepared by experimentally producing products with the combinations of the slab foams and sheets being variously changed. For example, as the sheet, there may be selected either a sheet having a gas permeability or a sheet having no gas permeability; and further, the sheet having a gas permeability may be made from one or two or more of materials selected from a group of consisting of a nonwoven fabric, a worsted felt and a victoria lawn. These data can be used for selecting a desirable state of the impregnated layer in accordance with the user's requirement. This makes it possible to design seat cushions having desirable characteristics.

BRIEF DESCRIPTION OF THE DRAWINGS

FIGS. 1A and 1B show a seat cushion according to an embodiment of the present invention, wherein FIG. 1A is a perspective view of the seat cushion, and FIG. 1B is a sectional view taken on line A—A of FIG. 1A;

FIGS. 2A and 2B are sectional views of a prior art seat cushion in which a cushion main body is joined on a slab foam by integral foaming, wherein FIG. 2A shows a state in which a local shrinkage occurs, and FIG. 2B shows a state in which a local camber occurs; and FIG. 3 is a graph showing load-deflection curves of seat cushions obtained in Examples 1, 2 and Comparative Example.

DETAILED DESCRIPTION OF PREFERRED EMBODIMENTS

Figure 1A:
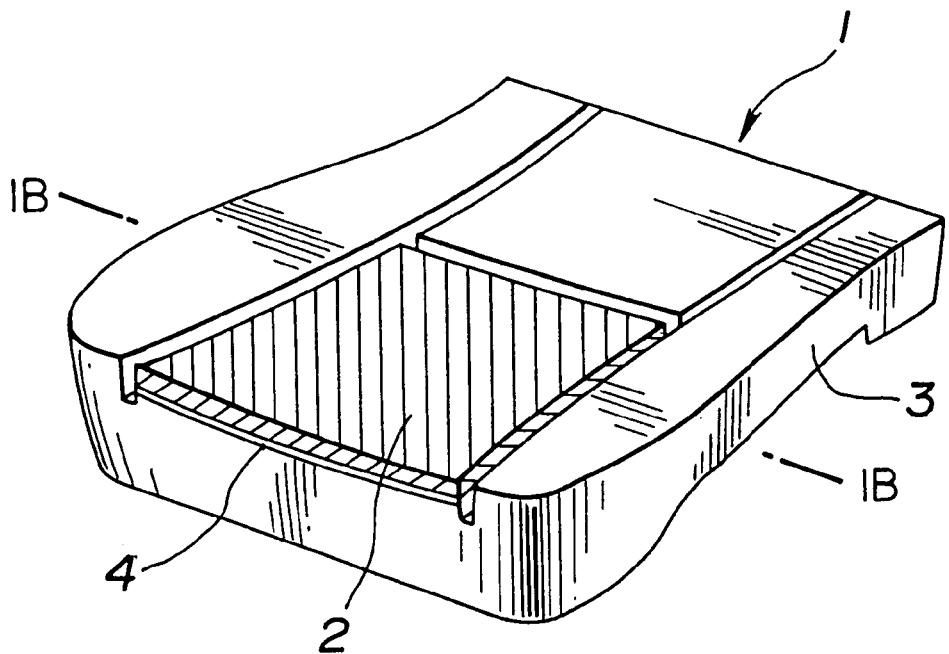
Figure 1B:
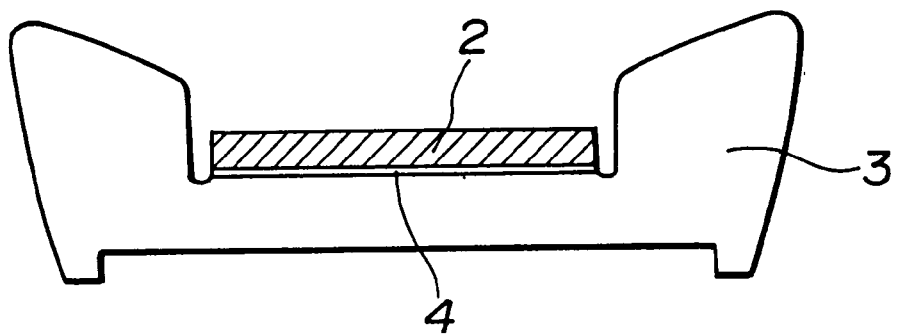

Referring to FIGS. 1A and 1B, a seat cushion 1 of the present invention is illustrated. The seat cushion 1 has a seat cushion main body 3 and a seat member 2 integrated on a seat surface portion of the cushion main body 3 through a sheet 4. The cushion main body 3 is formed of a polyurethane molded foam, and the seat member 2 is formed of a slab flexible polyurethane foam. In addition, the above polyurethane molded foam forming the cushion main body 3 may be either of flexible, semi-rigid, and rigid polyurethane foams. In the present invention, it may be preferably flexible polyurethane foam.

To achieve the object of the present invention, for the flexible polyurethane molded foam forming the cushion main body 3, the hardness (in JIS K6382) may be in a range of 4 to 20 kgf/200 mm diameter, preferably 8 to 12 kgf/200 mm diameter; and the density may be in a range of 25 to 60 kg/m$^3$, preferably 30 to 50 kg/m$^3$. On the other hand, for the slab flexible polyurethane foam forming the seat member 2, the hardness (in JIS K6382) may be in a range of 10 to 30 kgf/200 mm diameter, preferably 15 to 25 kgf/200 mm diameter; and the density may be in a range of 30 to 70 kg/m$^3$, preferably 35 to 60 kg/m$^3$.

The sheet 4 may be formed of either a material having a gas permeability or a material having no gas permeability. For the sheet material having a gas permeability, the unit weight thereof can be variously selected, and in particular, it may be in a range of 10 to 300 g/m$^2$, preferably, 40 to 150 g/m$^2$; and the thickness thereof may be in a range of 10 $\mu$m to 5 mm, preferably 0.5 to 3 mm. In addition, the sheet can be made of not only one kind of material satisfying such a requirement but also the combination of two or more kinds of materials satisfying the requirement.

The sheet having no gas permeability may be made of polypropylene, polyethylene, polyurethane, vinylon, or nylon, and from the viewpoint of integration with the cushion main body and the seat member, it may be preferably made of polyurethane. The sheet may have a thickness of 1 to 1000 $\mu$m, preferably, 10 to 100 $\mu$m. In addition, for the polyurethane sheet, the hardness (in JIS K6301) may be preferably in a range of 70 to 100 with a JIS A hardness tester.

The seat cushion of the present invention is configured, so if it has a sheet made of a material having a gas permeability, that part of a foamable liquid permeates in the sheet and a seat member, and is foamed when the foamable liquid having not permeated in the sheet and the seat member is foam molded into a polyurethane molded foam forming the cushion main body. Thus the seat member is integrally joined to a seat surface portion of the cushion main body through the sheet.

In producing the seat cushion by integral foaming of the slab polyurethane foam as the seat member with a polyurethane molded foam forming the cushion main body, the seat member is set in a mold at a position corresponding to a seat surface portion of the cushion main body; a sheet having a gas permeability is laminated on a surface, facing the seat surface portion, of the seat member; a foamable liquid is poured in the mold; and the foamable liquid having not permeated in the sheet and the seat member is foam molded into the cushion main body, and simultaneously part of the foamable liquid having permeated in the sheet and the seat member is foamed; whereby the seat member is integrally joined on the seat surface portion of the cushion main body through the sheet.

In this case, the setting of the sheet on the slab foam may be performed by simply laminating the sheet on the slab foam. If necessary, it may be performed by partially or entirely bonding the sheet on the slab foam using an adhesive or a means such as thermal fusion.

On the other hand, in the case of using a sheet formed of a material having no gas permeability, the sheet is previously laminated and bonded on the slab foam, to form a laminated body. The bonding may be performed using a synthetic rubber based adhesive, a sintering or dry lamination process, or a flame-laminating or thermal fusion process. Then, the laminated body is set in the mold at a position corresponding to a seat surface portion of the cushion main body in such a manner that the sheet faces the seat surface portion; and a foamable liquid is poured in the mold and is then foam molded, thereby forming the cushion main body and simultaneously integrally joining the sheet on the cushion main body. Thus, there can be obtained a seat cushion in which the seat member is integrally joined on the seat surface portion of the cushion main body through the sheet.

According to the above process of the present invention, the hardness and the thickness of an impregnated layer of the slab foam can be adjusted by suitably selecting the properties of the slab foam and the kind and the properties (in particular, unit weight) of the sheet material.

Figure 2A:
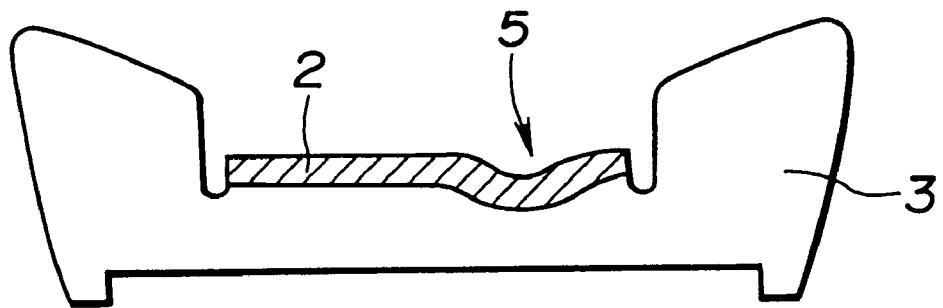
Figure 2B:
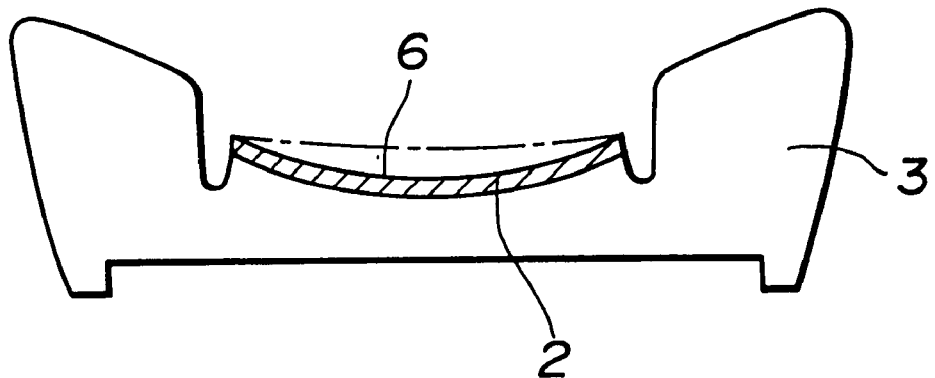

Moreover, according to the process of the present invention, since the sheet is disposed at the interface (contact surface) between the slab foam and the foamable liquid, it is possible to forcibly suppress extension of the contact surface of the slab foam with the foamable liquid, which is caused by expansion of the foamable liquid when the foamable liquid is foam molded, and hence to prevent occurrence of a local camber 6 and/or a local shrinkage 5 shown in FIG. 2.

EXAMPLE

The present invention will be more clearly understood with reference to the following examples, although the present invention is not limited thereto.

Example 1

A nonwoven fabric (gas permeability: 420 cc/cm$^2$/sec, unit weight: 30 g/m$^2$, thickness: 0.2 mm) was flame-laminated (thermally fused) on a slab foam surface (size: 300 mm×300 mm) of a slab flexible polyurethane foam (density: 0.050 g/cm$^3$, size: 300 mm×200 mm×20 mm), and the laminated body was set in a lower half of a mold for molding a material for a seat cushion molded product in such a manner that the nonwoven fabric was brought in contact with a foamable liquid to be poured in the lower half of the mold. Then, the foamable liquid for forming a flexible polyurethane molded foam was poured in the lower half of the mold, followed by setting of an upper half of the mold on the lower half of the mold, and the foamable liquid was then integrally foam molded. A molded product of the seat cushion was then released from the mold.

An impregnated layer as an intermediate layer (part of slab foam+nonwoven fabric) of the three-layered structure of the molded product was then measured in terms of thickness. As a result, it was found that the thickness of the impregnated layer was 2 mm.

The slab foam portion, integrally foamed with the polyurethane molded foam, was then visually observed. As a result, any camber or shrinkage was not observed at the slab foam portion.

Example 2

Molded products of seat cushions were produced in the same manner as in Example 1, except for using slab foams on which worsted felts (unit weight: 60 g/m$^2$, thickness: 2 mm; and unit weight: 100 g/m$^2$, thickness: 3 mm) were flame-laminated in place of the nonwoven fabric used in Example 1.

The thicknesses of impregnated layers (part of slab foams+worsted felts) as the intermediate layers of the products were 4 mm, 5 mm, respectively. Each slab foam portion on the surface of the product was visually observed. As a result, any camber and shrinkage was not observed at the slab foam portion.

Example 3

A molded product of a seat cushion was produced in the same manner as in Example 1, except for using a slab foam on which a victoria lawn (# 2012, thickness: 0.3 mm) was flame-laminated in place of the nonwoven fabric used in example 1.

The thickness of an impregnated layer as an intermediate layer of the product was 4 mm. The slab foam portion on the surface of the product was visually observed. As a result, any camber and shrinkage was not observed at the slab foam portion.

Example 4

A molded product of a seat cushion was produced in the same manner as in Example 1, except for using a nonwoven fabric having a low gas permeability (80 cc/cm$^2$/sec). The thickness of an impregnated layer as an intermediate layer was 0 mm. The slab foam portion on the surface of the product was visually observed. As a result, any camber and shrinkage was not observed at the slab foam portion.

Example 5

A molded product of a seat cushion was produced by setting only a slab foam in the lower half of the mold, laminating the same nonwoven fabric as used in Example 1 on the slab foam without bonding thereto, and pouring the foamable liquid, followed by integral foaming. Even in this process, any camber and shrinkage was not observed at the slab foam portion. In addition, the thickness of an impregnated layer as an intermediate layer was 2 mm.

Example 6

A molded product of a seat cushion was produced in the same manner as in Example 1, except for using a polyurethane film (thickness: 30 μm) having no gas permeability. The thickness of an impregnated layer as an intermediate layer was 0 mm. The slab foam portion on the surface of the product was visually observed. As a result, any camber and shrinkage was not observed at the slab foam portion.

COMPARATIVE EXAMPLE 1

A single slab foam cut in a specific shape was integrally formed on a seat surface portion of a seat cushion main body for improving a feeling of seating and a vibration characteristic of a seat cushion. More specifically, the single slab foam was set in a lower half of the mold, and a foamable liquid for forming a urethane foam was poured into the lower half of the mold, followed by integral foaming, to produce a molded product of a seat cushion. The molded product was visually observed. As a result, a local camber and a shrinkage of 8 mm at maximum based on the normal shape occurred at the slab foam portion on the surface of the product (see FIG. 2). In addition, the thickness of an impregnated layer was 4 mm.

The results of Examples 1 to 6 and Comparative Example 1 are shown in Table 1.

TABLE 1

| | | Example | | | | | | Comparative Example |
|---|---|---|---|---|---|---|---|---|
| | | 1 | 2 | 3 | 4 | 5 | 6 | 1 |
| integrated material | A | | | | | ○*2 | | ○ |
| | B | ○*1 | | | | | | |
| | C | | ○*1 | | | | | |
| | D | | | ○*1 | | | | |
| | E | | | | ○*1 | | | |
| | F | | | | | ○*1 | | |
| | G | | | | | | ○*1 | |
| thickness of impregnated portion (mm) (N = 10) | | 2 ± 0.2 | 4 ± 0.3 | 5 ± 0.4 | 4 ± 0.3 | 0 ± 0.1 / 2 ± 0.2 | 0 ± 0 | 4 ± 0.3 |
| evaluation camber, shrinkage at impregnated portion | | | | absence | | | | presence |

[integrated material]
A: only slab foam
B: slab foam + nonwoven fabric (30 g/m$^2$) having large gas permeability
C: slab foam + worsted felt (60 g/m$^2$)
D: slab foam + worsted felt (100 g/m$^2$)
E: slab foam + victoria lawn (#2012)
F: slab foam + nonwoven fabric (30 g/m$^2$) having small gas permeability
G: slab foam + polyurethane sheet (30 μm) having no gas permeability
*1 thermal fusion
*2 only lamination without thermal fusion Next, a load-deflection curve of each of the vehicular polyurethane foam seat cushions obtained in Examples 1, 2 and Comparative Example 1 was measured by compressing the seat cushion up to 75% of the thickness using a pressing disk of 200 mm in diameter. The results are shown in FIG. 3.

As is apparent from Examples 1 to 6 and Comparative Example 1, in the case of the seat cushion of the present invention, the impregnated state (for example, thickness) of the impregnated layer can be adjusted by selecting the type, material, thickness, unit weight and the like of the sheet provided at the interface where the slab foam is brought in contact with a foamable liquid for forming the polyurethane molded foam. Thus, as shown in FIG. 3, the load-deflection curve of the product obtained according to the present invention can be arbitrarily changed. This becomes an effective design means for changing various physical properties, feeling of seating, and riding comfortability of the seat cushion.

For the seat cushion obtained according to the present invention, moreover, the sheet in contact with the slab foam forcibly suppresses extension of the slab foam due to expansion of the foamable liquid when the foamable liquid is poured, so that it is possible to prevent occurrence of a local camber and/or a local shrinkage of the slab foam portion.

As described above, according to the present invention, by interposing a sheet at the interface between a seat surface portion of a cushion main body and a seat member, it is possible to obtain a desired state (for example, thickness) of an impregnated layer by controlling the impregnated state of the foamable liquid at the interface and also prevent occurrence of a camber and/or a shrinkage, and hence to obtain a seat cushion preferable in a feeling of seating.

While the embodiment of the present invention has been described using specific examples, such description is for illustrative purposes only, and it is to be understood that changes and variations may be made without departing from the spirit or scope of the following claims.

We claim:

1. A seat cushion comprising:

a cushion main body formed of a polyurethane molded foam;

a seat member formed of a slab flexible polyurethane foam; and a sheet having a gas permeability made of one or two or more kinds of materials selected from the group consisting of a nonwoven fabric, a worsted felt, and a victoria lawn; wherein part of a foamable liquid for forming said polyurethane molded foam permeates in said sheet and said seat member, and is foamed when the foamable liquid having not permeated in said sheet and said seat member is foam molded, whereby said seat member is integrated with a seat surface portion of said cushion main body through said sheet.

2. A seat cushion according to claim 1, wherein said cushion main body comprises a polyurethane molded foam having a hardness of 4–20 kgf/200 mm diameter measured on JIS K6382.

3. A seat cushion according to claim 1, wherein said cushion main body comprises a polyurethane molded foam having a density in the range of 25–60 kg/m$^3$.

4. A seat cushion according to claim 1, wherein said seat member comprises a slab flexible polyurethane foam having a hardness of 10–30 kgf/200 mm measured on JIS K6382.

5. A seat cushion according to claim 1, wherein said seat member has a density in the range of 30–70 kg/m$^3$.

6. A seat cushion according to claim 1, wherein said sheet has a unit weight in the range of 10–300 g/m².

7. A seat cushion according to claim 1, wherein said sheet has a thickness in the range of 10 μm to 5 mm.

8. A seat cushion comprising:
- a cushion main body formed of a polyurethane molded foam;
- a seat member formed of a slab flexible polyurethane foam; and
- a sheet having no gas permeability, said sheet being bonded to said seat member;
- wherein a seat surface portion of said cushion main body is integrally joined to said sheet by foaming of a foamable liquid for forming said polyurethane molded foam.

9. A seat cushion according to claim 8, wherein said sheet having no gas permeability is made of one or two or more kinds of materials selected from the group consisting of polypropylene, polyethylene, polyurethane, vinylon, and nylon.

10. A seat cushion according to claim 8, wherein said cushion main body comprises a polyurethane molded foam having a hardness of 4–20 kgf/200 mm diameter measured on JIS K6382.

11. A seat cushion according to claim 8, wherein said cushion main body comprises a polyurethane molded foam having a density in the range of 25–60 kglm³.

12. A seat cushion according to claim 8, wherein said seat member comprises a slab flexible polyurethane foam having a hardness of 10–30 kgf/200 mm measured on JIS K6382.

13. A seat cushion according to claim 8, wherein said seat member has a density in the range of 30–70 kg/m³.

14. A seat cushion according to claim 8, wherein said sheet has a thickness in the range of 1.0 to 1000 μm.

15. A seat cushion according to claim 8, wherein said sheet comprises a polyurethane sheet having a hardness in the range of 70–100 measured on JIS A.

* * * * *